(12) United States Patent
Baker

(10) Patent No.: US 9,786,283 B2
(45) Date of Patent: Oct. 10, 2017

(54) TRANSCRIPTION OF SPEECH

(71) Applicant: JPAL Limited, Beaconsfield, Buckinghamshire (GB)

(72) Inventor: John Richard Baker, Chalfont St Giles (GB)

(73) Assignee: JPAL LIMITED, Beaconsfield, Buckinghamshire (GB)

( * ) Notice: Subject to any disclaimer, the term of this patent is extended or adjusted under 35 U.S.C. 154(b) by 229 days.

(21) Appl. No.: 14/389,728

(22) PCT Filed: Mar. 26, 2013

(86) PCT No.: PCT/GB2013/050778
§ 371 (c)(1),
(2) Date: Sep. 30, 2014

(87) PCT Pub. No.: WO2013/144605
PCT Pub. Date: Oct. 3, 2013

(65) Prior Publication Data
US 2015/0066505 A1    Mar. 5, 2015

(30) Foreign Application Priority Data
Mar. 30, 2012  (GB) .................................. 1205790.7

(51) Int. Cl.
*G10L 15/26* (2006.01)
*G10L 25/78* (2013.01)
(Continued)

(52) U.S. Cl.
CPC ...... *G10L 15/265* (2013.01); *G06F 17/30746* (2013.01); *G06F 17/30796* (2013.01);
(Continued)

(58) Field of Classification Search
CPC ................................. G10L 15/26; G10L 25/78
See application file for complete search history.

(56) References Cited

U.S. PATENT DOCUMENTS 3,648,249 A    3/1972  Goldsberry
5,712,957 A *  1/1998  Waibel .................... G06K 9/03
                                                                704/240
(Continued)

FOREIGN PATENT DOCUMENTS

CN    1578976 A      2/2005
DE    19510095       9/1996
(Continued)

*Primary Examiner* — Samuel G Neway
(74) *Attorney, Agent, or Firm* — Thomas M. Freiburger

(57) ABSTRACT

A speech media transcription system comprises a playback device arranged to play back speech delimited in segments. The system is programmed to provide, for a segment being transcribed, an adaptive estimate of the proportion of the segment that has not been transcribed by a transcriber. The device is arranged to play back that proportion of the segment, optionally after having already played back the entire segment. Additionally, a segmentation engine is arranged to divide speech media into a plurality of segments by identifying speech as such and using timing information but without using a machine conversion of the speech media into text or a representation of text.

8 Claims, 4 Drawing Sheets

(51) Int. Cl.
    *G06F 17/30*    (2006.01)
    *G10L 15/08*    (2006.01)
    *G10L 25/87*    (2013.01)

(52) U.S. Cl.
    CPC .............. *G10L 15/08* (2013.01); *G10L 15/26* (2013.01); *G10L 25/78* (2013.01); *G10L 25/87* (2013.01); *G10L 2015/088* (2013.01)

(56) References Cited

U.S. PATENT DOCUMENTS

| | | | |
|---|---|---|---|
| 6,064,961 A * | 5/2000 | Hanson | G10L 15/26 704/235 |
| 6,161,087 A * | 12/2000 | Wightman | G10L 15/26 704/215 |
| 6,865,258 B1 * | 3/2005 | Polcyn | G10L 15/26 379/265.01 |
| 6,952,673 B2 * | 10/2005 | Amir | G10L 13/00 704/207 |
| 7,212,873 B1 * | 5/2007 | Townsend | G11B 19/00 369/25.01 |
| 7,236,932 B1 | 6/2007 | Grajski | |
| 7,274,775 B1 * | 9/2007 | Zavaliagkos | H04M 3/533 369/25.01 |
| 7,292,976 B1 | 11/2007 | Hakkani-Tur et al. | |
| 2002/0069055 A1 * | 6/2002 | Tang | G10L 15/26 704/235 |
| 2003/0083885 A1 | 5/2003 | Frimpong-Ansah | |
| 2004/0006481 A1 * | 1/2004 | Kiecza | G10L 25/78 704/276 |
| 2006/0149558 A1 | 7/2006 | Kahn et al. | |
| 2007/0033032 A1 * | 2/2007 | Schubert | G10L 15/22 704/235 |
| 2008/0195370 A1 * | 8/2008 | Neubacher | G10L 15/26 704/1 |
| 2008/0312919 A1 * | 12/2008 | Grobauer | G10L 15/26 704/235 |
| 2008/0319743 A1 | 12/2008 | Faisman et al. | |
| 2009/0299744 A1 | 12/2009 | Tachimori | |
| 2009/0319265 A1 * | 12/2009 | Wittenstein | G10L 21/04 704/234 |
| 2010/0023330 A1 | 1/2010 | Allen et al. | |
| 2010/0100382 A1 | 4/2010 | Rao et al. | |
| 2010/0318355 A1 | 12/2010 | Li et al. | |
| 2012/0016671 A1 * | 1/2012 | Jaggi | G10L 15/22 704/235 |
| 2015/0066505 A1 * | 3/2015 | Baker | G10L 25/87 704/235 |

FOREIGN PATENT DOCUMENTS

| | | |
|---|---|---|
| WO | WO9409485 | 4/1994 |
| WO | WO2007056532 | 5/2007 |

* cited by examiner

TRANSCRIPTION OF SPEECH

BACKGROUND TO THE INVENTION

This invention relates to methods of segmenting and transcribing recordings of speech and speech components of video, audio or multimedia files or transmissions, such recordings and components herein collectively being called "speech media". "Speech" as used herein includes both spoken audio and any other forms of oral delivery which may be interpreted as utterances capable of being represented textually.

Audio and video media in their "raw" state are opaque in the sense that, in order to know what is in them, a person has to listen to the material (and watch in the case of video). Additional information can be associated with the audio or video, by tagging the media as an entity with titles, copyright, author, keywords and other information (for example, as is done with media metadata associated with MP3 files under the ID3 standard). In addition, timed information including speech text information, herein collectively being called "timed media metadata" can be associated with the media file which allows suitable systems to display information such as captions and subtitles (as well as other metadata if desired) at the correct time in the media.

Whether tagging the whole file, or whether providing information regarding timed events in the media, the associated timed media metadata may either be embedded with the media file itself (if suitable tools, formats and players exist), or separately in Timed Text files (with many different standardized formats such as the W3C Timed Text Markup Language (TTML, also Distribution Format Exchange Profile DFXP) or Synchronized Multimedia (SMIL) standard and proprietary standards) or in databases.

A timed portion of the speech media (which may also include temporal offset, playback rates and references to original media) in conjunction with textual and other metadata (which may also include detailed timing information at a shorter interval) is associated with a portion of the speech media herein collectively being referred to as a "segment".

Media files and associated metadata may also be grouped into playlists or channels, which allow display, selection and playback of a group of media. Where such playlists can be associated with applicable timed media metadata, then the whole playlist effectively embodies the timing, textual and other metadata for applications of this method.

There is substantial value in enabling the location of media by search because effective search by search engines provides revenue opportunities from advertisers and sponsors. From the consumer's perspective (a consumer being anyone who is seeking to watch or listen to media), the ability to find suitable video and audio content through textual search of the contents, rather than reliance on any titles and overall media tags is substantial.

In addition, once the media is found, consumers may (with suitable players) search to particular time positions within the media playback, on the basis of text search within the timed media metadata, which allows the suitable player to commence playback at the appropriate position of interest (rather than the consumer needing to scrub through the playback). This allows the consumer to experience relevant portions of the media rather than watch irrelevant sections.

Currently, there are legislative requirements for broadcast media in many jurisdictions that require suitable assistance for Access, which result in timed text metadata being available as Closed Captions for example.

In the case of video and audio material which is delivered on the Web (for example, on the BBC iPlayer, Google's YouTube™ service, and other online video publishing services which support captions or subtitles), the prevalence of material which has associated metadata available is limited (as is the legislative position). This is despite the fact that the availability of this metadata is even more valuable than in the Broadcast situation, not only does it assist with Access, but also allows the media to be found more easily by search engines, as well as making it possible for the user to quickly locate within the media the section of relevance.

In addition, there are possibilities for rich and varied metadata delivery (e.g. associated images) with the timed media metadata which enhances its engagement and value for the user and makes it more likely for the user to absorb the desired message, or to "click-through" onto other places of relevance. Also, it is possible to associate the current textual segment metadata with the context for relevant advertisements. The timed association of materials also assists in a pedagogical context.

The main impediments to adding the rich metadata to audio and video material are the complexity and effort required to do so with current production and publishing systems.

There are a variety of current systems that assist with the production of Captions, subtitles and various timed text formats. For example, captions and markers can be added manually to the timeline of video/audio production systems; in the case of video, using systems such as Microsoft Expression® Encoder, Sony Vegas™ Pro, Apple® Final Cut Pro® or Adobe Premiere®. Alternatively, dedicated caption and subtitle systems can be used, requiring the user to mark the timing of events as well as adding the metadata such as the transcription that will make up the timed media metadata, and these can either be imported to the media production tools to create embedded timed media information, or else Timed Text files which are associated with the media in the players. Additionally, steganography requires special transcription terminals operable by trained transcribers, and is particularly suited for live captioning. Also, Automatic Speech Recognition (ASR) systems are able to produce timed text which is recognised according to various speech models and produced by generating the expected words. Due to the inaccuracy of ASR systems, one approach is to use ASR trained to an individual transcriber's patterns, and to have that individual re-read what is said in the audio/video material and insert the re-reading into the caption with resulting higher quality results because the recognition is superior.

It is also possible to derive timed captions from existing video material by use of Optical Character Recognition techniques. This relies of course on an existing transcript being already embedded in the material.

The current prevalence of speech media that have been associated with timed media metadata is low. This reflects the challenges of time and/or expense in using current systems. In the case of automated ASR, the quality of the resulting transcript is inadequate for many serious applications, and the re-reading approach is also time-consuming.

SUMMARY OF THE INVENTION

It is an aim of the invention to alleviate some or all of these disadvantages.

Embodiments of the invention address the need to be able to efficiently produce high quality transcripts and other metadata by transcribers who are not necessarily highly proficient, and allow an end-to-end process to produce and publish the results of the transcription.

From a first aspect, the present invention provides a speech media transcription system comprising a playback device arranged to play back speech delimited in segments, the system being programmed to provide, for a segment being transcribed, an adaptive estimate of the proportion of the segment that has not been transcribed by a transcriber, the device being arranged to play back said proportion of the segment. Such playback therefore occurs when it is likely that the speech has gone beyond the transcriber's ability to recall it all. A suitable replay position can be calculated on the basis of a configurable lead-in time (with optional volume fade-in), and commencing on word boundaries if available; or else the start of the segment if that position is in any case close to the start, and if close to the end, a minimum level of replay is provided. In addition, facilities can be provided for the transcriber to use keyboard combinations to cause the system to replay from the replay position or start of segment.

The playback device may be arranged to play back an entire segment prior to playing back said proportion estimated not to have been transcribed.

The adaptive estimates may be made on the basis of at least one of: an amount of text likely to be present in the segment, the speaking speed of the speaker, a text input rate of the transcriber, a working memory of the transcriber, or the current activity of the transcriber, i.e. whether transcription is currently occurring. Where analysis of a segment indicates that it likely contains no speech, the segment can be omitted from playback or played at high speed.

The system may monitor the text input rate of the transcriber and play back speech at a speed depending on said text input rate.

A punctuation mark typed at the beginning of a segment may be automatically transferred to a previously typed segment.

The system may include a facility for automatically replaying said speech for review and correction of a transcription, and/or a facility for allowing identification by a reviewer of segments of text considered erroneous.

From a second aspect, the invention provides a method of transcribing speech media, comprising providing a system as set out above, allowing a transcriber to transcribe part of a segment of the speech media, replaying said proportion of the segment estimated not to have been transcribed, and subsequently determining that said segment has been completely transcribed.

From a third aspect, the invention provides a segmentation engine arranged to divide speech media into a plurality of segments by identifying speech as such and using timing information but without using a machine conversion of the speech media into text or a representation of text.

The segmentation engine may be programmed to commence a segment, to measure time elapsed, to determine gaps between words in the segment, and ending the segment at a gap when said time elapsed in the segment is at least 1 second, preferably at least 2 seconds, and/or at most 15 seconds, preferably at most 10 seconds.

Timing information for the segmenting may be based on cues in the speech media, selected from the group consisting of: cues derived from an Automatic Speech Recognition system, cues derived from a Voice Activity Detection system and cues resulting from audio or video analysis of the speech media.

In one embodiment, the segmentation engine is programmed to insert an additional segment into a gap between two segments, to provide contiguous segments. The engine may alternatively or additionally be programmed to eliminate a gap between two segments, to provide contiguous segments. It may allow a user to split a segment into two or more segments and it may allow a user to merge two or more successive segments into one segment.

The segmentation engine may be programmed to preserve metadata from a segment in a subsequent segment in the absence of an indication that said metadata is inapplicable to said subsequent segment.

From a fourth aspect, the invention provides a method of segmenting speech media, comprising providing a segmentation engine as described above, analysing timing information to determine gaps between words, and ending segments at selected ones of said gaps between words.

The methods of the invention may include steps of displaying, publishing or transmitting a transcription produced by the method.

BRIEF DESCRIPTION OF THE DRAWINGS

Embodiments of the invention will now be described in more detail, by way of example only, with reference to the accompanying drawings, in which.

DETAILED DESCRIPTION OF PARTICULAR EMBODIMENTS

Figure 1:
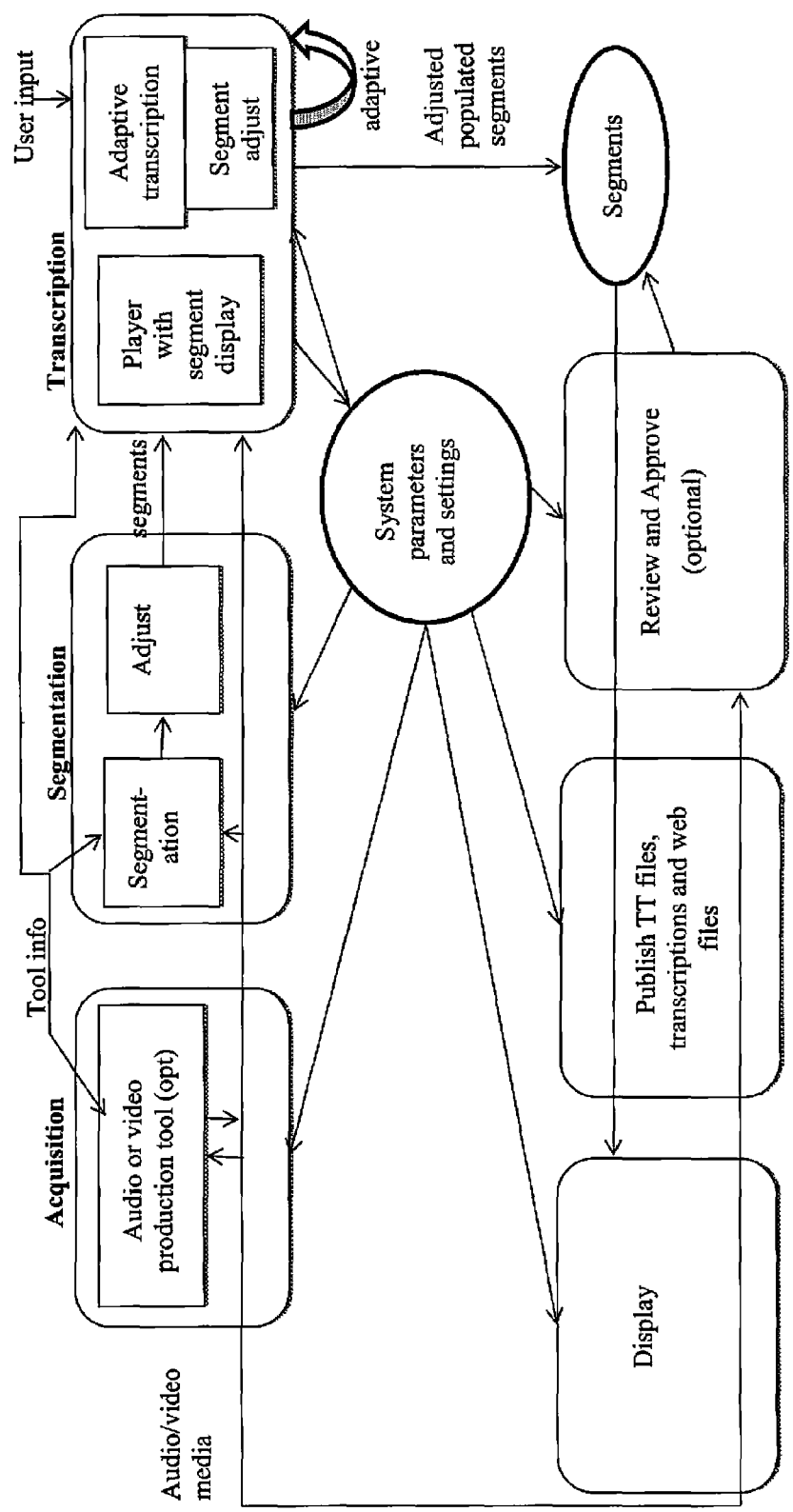
FIG. 1 is a block diagram showing a system according to the invention.

FIG. 1 gives an overview of a system according to the invention. The main steps of the method are:
Acquisition and production of the video or audio media by other systems (which may interact with the system of the invention);
Segmentation of the media to delineate suitable speech timing information;
Transcription of the segments to efficiently add textual and other information thereto;
Review and approval of the transcription;
Automatic production and publication with parameters provided by the user, of the segmented information in a variety of forms, including timed text files, and optionally as web pages, and a full transcript.

The invention provides a coherent end-to-end production and publishing system. Whilst the system may be mainly implemented in common personal computer systems, the functionality, flow and control mechanisms described can be implemented and the functionality distributed on a multiplicity of servers and processors, and this would in any case usually be the mechanism for publishing the resultant timed media metadata to consumers.

Acquisition and Production

Prior to segmentation, the production systems may need to perform a media format conversion to create suitable input for the Cue generation systems. For example, where the media is in H.264 format, it may be converted to a suitable audio format media for input to the Cue generation systems.

1. Segmentation

Figure 2:
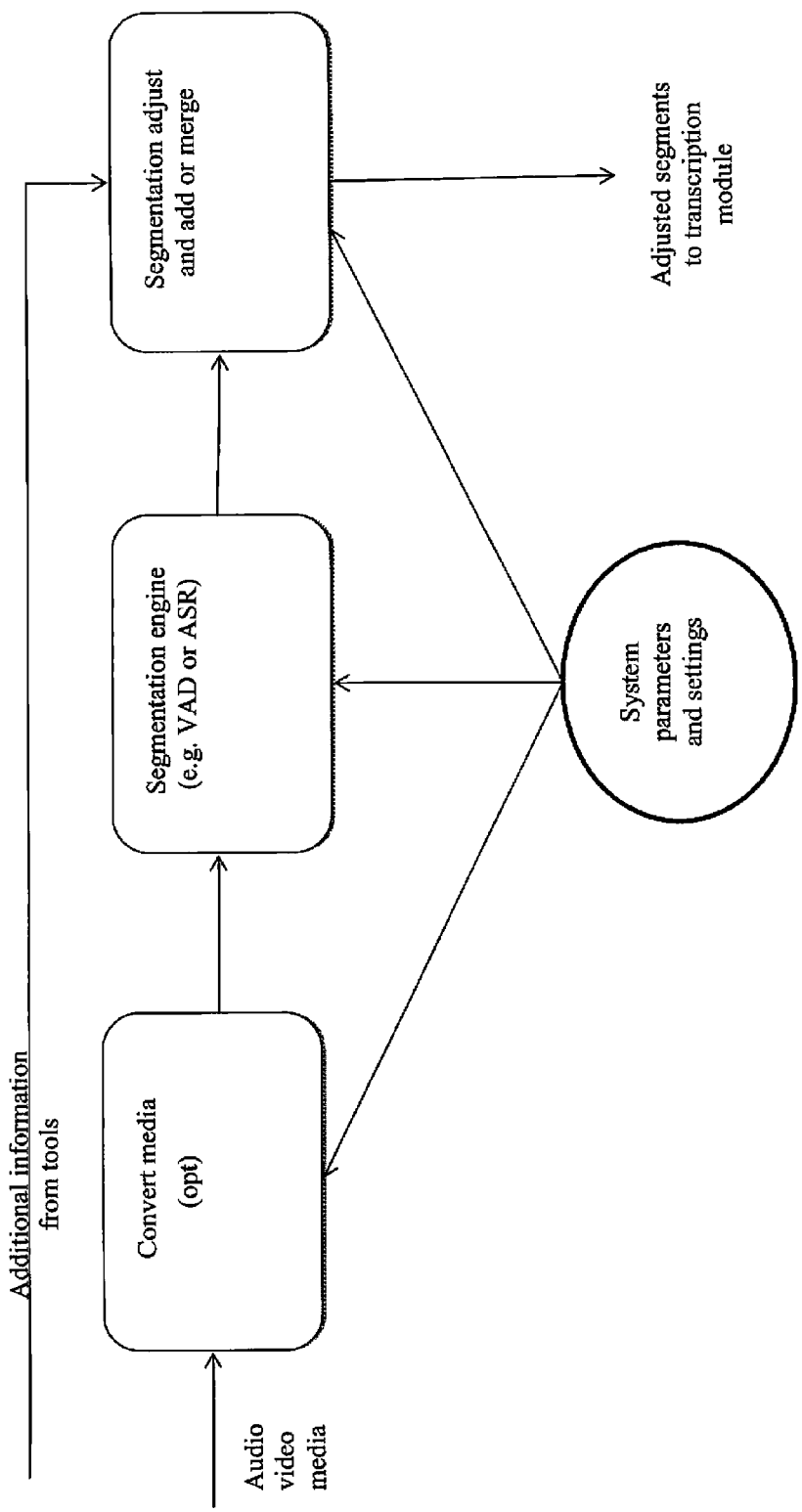
FIG. 2 is a block diagram showing in more detail the segmentation process of the system of FIG. 1.

FIG. 2 shows the segmentation process. This system provides the automatic ability to segment speech media into suitable length segments which are expected to hold coherent speech phrases. This differentiates it from systems which require manual marking of segment temporal positioning. In addition, segments may be provided that encompass the periods when there are not anticipated to be any speech to be transcribed.

1.1 Segment on Cues

The automatic segmentation is performed starting with known systems which are able to delineate speech utterances including timing information. These include (but are not limited to) Automatic Speech Recognition (ASR) systems and Voice Activity Detection Systems (VAD). These systems provide temporal and other Cues derived from the speech media which provide information to the segmentation system and also to other segment metadata and detailed segment granularity (e.g. at the word level in the case of ASR). Additional Cues may be derived from other characteristics of the audio or video media, for example, audio spectral composition and changes to that, or in the case of video, scene splitting events (cuts in the video composition), or the use of Face Recognition systems. All or some of these Cues can be used as desired.

ASR systems are currently used in producing automated captions, obtaining timing information coupled with the automatic production of textual information (which may of course be subsequently edited). In the present invention, the system is not dependent on word recognition by the system, but instead uses the timing information provided by the ASR system. Other characteristics of the recognition may be used, but not the proposed text from the ASR system, which is instead input by a transcriber.

The benefit of this lack of reliance on the ASR word production is three-fold.

Firstly the system does not require a trained ASR speech model to achieve accuracy in the usual situation where there are multiple speakers and a trained speech model does not exist for them in any case.

Second, poorer quality audio and the presence of a limited amount of background noise and music (for example) does not seriously affect the segmentation performance of the present system (whereas it drastically reduces the accuracy of the textual recognition by the ASR system).

Third, because the invention is not reliant on any particular ASR speech model, it works in a way that is essentially language independent. Speech models do not exist for some languages, so it is a major advantage to be able to use a single speech model for a language and apply it to other ones.

The segmentation system does take advantage of the word and phrase timings produced by the VAD or ASR systems. Rather than simply using the raw timings from these systems, the invention applies adjustments to the segmentation in the following ways.

1.2 Additional Cues

Segmentation choices may also be derived from additional Cues, so that for example, when there is a Video scene break, the system can prioritise that a segment break should occur at that time in the media if appropriate. Alternatively, if spectral analysis of audio indicates the likelihood of different speakers or changes at certain times in the speech media, this information may also affect the system's choice of segmentation timing (because it is desirable to create different segments for different speakers).

In addition, other characteristics of the Cues may provide additional information regarding segment adjustment and speaker assignment information for example. Information on the speaker(s) of a given segment is in some circumstances a useful part of the segment metadata, and can comprise a set of information including names, actors, images links and other desired information.

1.3 Minimum Length

Segments should normally be within a certain length range in order to be displayed correctly and to have a meaningful phrase. Segments that are too short (e.g. under 2 seconds) would not normally provide an intelligible phrase for captioning, although if speech is present over a shorter period with gaps in speech either side, this may be a valid utterance (typically an interjection) and allowed by the system (e.g. if someone says "Yes" as a logically distinct segment). It has also been found to be highly effective for the segmentation system to treat gaps in speech utterance of 300 ms or above as a distinct segment.

1.4 Anti-Flash

In addition, the system protects the viewer of the caption and display output from "too-rapid" transitions which are known to cause possible health problems (e.g. legislation and standards avoiding "flashing" in media inducing epilepsy). Because the minimum length of segment is limited, including in the output, the system avoids these issues automatically. This is not the case for manual systems or automated systems that have no adequate post-processing.

1.5 Maximum Length

Segments may also be too long, typically if they are over 10 seconds in length (subject to system configuration). They are too long for two reasons: firstly, there is limited display length that will "fit" in the target display (usually this will comprise two lines of text). Secondly, the aim of the system is to provide a semantic "chunk" of meaning, and this will usually be achieved in a shorter length of speech. The system is automatically able to estimate suitable segment splitting when this threshold is exceeded, and for ASR based segmentation, can perform that segmentation at the most suitable boundary between words where there is likelihood of a suitable split (e.g. when there is a slight gap between words). Where this automatic segment splitting does not achieve the desired result, it may be manually adjusted as described below.

The segmentation system may create segments that are longer than those described above in cases where the section of the speech media is not expected to have intelligible speech information, and mark the segments accordingly.

1.6 Contiguous Segments

For many applications, as well as for the transcription process, it is desirable to adjust the timing of, and/or add additional segments, to create a contiguous set of segments spanning the whole media. This contiguous characteristic may be required for suitable display using some embedded or Timed Text format systems and the associated display devices. Also, some Timed Text formats do not support an end time for the segment, in which case, if desired, an additional segment may be inserted which causes the display to be changed at the appropriate time. Contiguous segments (and appropriately marked segments indicating whether they likely contain speech or not), may be useful for the purposes of transcription or review Where the gaps between the segments derived from the Cues is configurably small (usually around 1 second) the system can choose to "close up" the timing of the two adjacent segments so that they become contiguous rather than insert a short additional segment.

1.7 Manual Selection

In some circumstances, it may be advantageous for the system to derive cues from manual selection of a section of the media, from a timeline display of a multi-track editor (whether audio or video), or else a timeline supported by the system or by indicating start and stop positions with keyboard gestures during playback for example. The selected time interval can be used as another Cue for the segmentation system, noting that existing segments may need to be adjusted for contiguity and length.

1.8 Manual Adjustment

Manual adjustment of segment timing is provided to transcribers or reviewers, and this can be delivered in a range of mechanisms. Manual input may also be used to change the start or end times of a segment (for example by using "nudge" forward and backward, dragging a slider indicating position, selection of a timeline position, or in the case of ASR, automatically changing timing to a word boundary). When the user makes these changes, the segmentation system may automatically adjust adjacent segments so that they remain contiguous.

1.9 Split and Merge

As well as changing the segment start and endpoint times, the transcriber may wish to split a segment into two segments, each shorter (in duration); indication of this split time may be done on the same basis as start or end-point time changes. When this is done, the user may also indicate in an existing segment transcript where the text split point is, so that the appropriate text is placed in each of the two resultant segments. The system provides the ability to copy the original segment metadata to both resultant segments (e.g. speaker information, images). Alternatively, the transcriber or reviewer may also wish to merge two or more selected contiguous segments. In this case, the start point of the single merged segment is the start point of the first selected segment, and the end point is the end point of the last selected segment. In this instance, the resultant transcript represents the amalgamation of the individual segments to be merged in sequence. Where other metadata is non-textual and cannot be straightforwardly merged in this way, the system may provide a default selection (for example, that the speaker applicable to the merged segment is the one defined in the first segment to be merged).

1.10 Auto Run-On

In order to avoid the transcriber needing to continually provide invariant information to the segment metadata, the system provides configurable mechanisms to allow "run-on" between segments. The use of run-on, and its application to different formats is controlled by parameters. Metadata can be considered as continuing in cases where a particular item has not received any transcriber or reviewer input. In this case, the system can copy information from the first valid previous segment. So, for example, information regarding a speaker of a set of segments may be marked once at the start of the speech, and subsequent segments are assumed to be spoken by that speaker (and the necessary data filled in automatically by the system when publishing the information)—until explicitly specified otherwise.

1.11 Anti-Flicker

Segment display systems can be provided which check whether a particular piece of metadata has changed between segments (noting that, even if a caption or subtitle has changed, other items of metadata may not do so). Some types of display system, if provided with information to write to a display area may exhibit visually distracting behaviour even when the information is the same. The player system can avoid this condition by refraining from writing to the display until it is necessary to change that area. This functionality is especially important for the display of image data and is applicable to display systems operating during transcription and/or review as well as to media product.

1.12 Segmentation Refresh

In the case of any segment adjustment (whether through changes made by people, or due to choices associated with display types or formats), the system can perform any or all of the operations that have been described in sections 1.1 to 1.12 above.

2. Transcription

Figure 3:
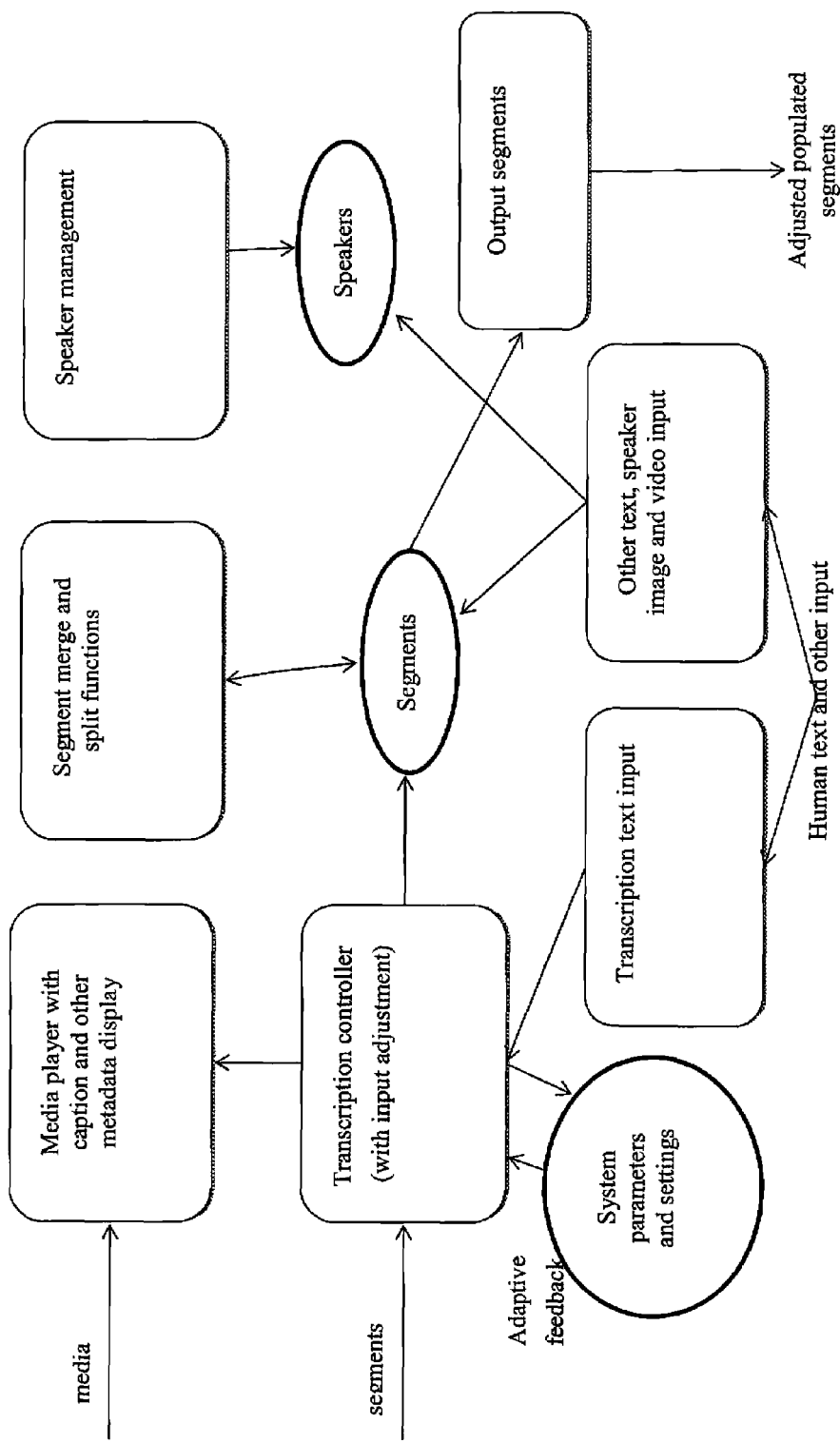
FIG. 3 is a block diagram showing in more detail the transcription process of the system of FIG. 1.

FIG. 3 shows the transcription process. Once high quality segments are available, the system controls the playback of each segment to the human transcriber using a range of control and adaptive measures.

For the purposes of this description, the human text input can be performed using a normal keyboard mechanism, or be input via speech recognition technology as described by the "re-reading" mechanism, or by any other text input method.

2.1 No-Speech Handling

The segmentation process may identify sections of the speech media which are unlikely to contain intelligible speech information. The transcription and review playback mechanisms can be caused either to skip such segments, or else play them back at higher speeds, thus saving time (or of course play them normally). The implementation is straightforward, checking the marking as such by the segmentation system.

2.2 System Assisted Transcription Playback and Replay

Whereas existing systems work best with highly proficient transcribers, with optional additional stenography equipment or foot-pedal assistance, the transcription system of the invention assists a wide range of people to efficiently input high-quality transcriptions and captions with standard equipment.

This is done on the basis of adaptive estimation of:
a) The amount of text that is likely to be entered in transcribing the segment;
b) The reading speed of the speaker;
c) The typing speed of the transcriber;
d) The working memory of the transcriber.

In the case of a), the amount of text (whether measured by characters, words or phonemes) in a segment is predictable from natural human speech rates. Although these do vary between individuals and sometimes with conditions, we have found that normally speech rates occur at a predictable and narrow range. As the transcription proceeds, we obtain further information on the actual rate of speech delivery in this transcription, so the system can adapt to the current situation using a range of adaptive algorithms (for example, exponential averaging) from the a priori rate.

The upshot of a) and b) is that the system can predict, with some accuracy, the amount of text that will need to be input to complete the segment being transcribed.

Regarding c), the typing or input rate of the transcriber can be measured by the system. This measurement can start from system settings (such as an assessment of input skills, or measurement of a test transcription). Further refinement of the transcriber input rate can be achieved by means of system knowledge of the actual input rate over this transcription as well as previous transcriptions (which can also include a knowledge of the class of input—similar transcriptions and transcription difficulties will be grouped together in natural projects, for example, the transcriptions from a particular customer or genre). This allows adaption to more or less "difficult" media.

Regarding d), again, a priori estimates of the working memory of a person can proceed from a typical but low estimate, then be refined by the system as input is made (as in case c). In particular, the system can detect that the end of the media has not been reached, but typing has stopped, without the user signalling the end of the segment.

One of the main issues for transcription input is that many people will enter the information slower than the speech. This means that the user will only have typed a fraction of the required text by the time the playback of the segment has finished.

The presence of segmentation on its own is useful in this respect because the amount of media played back is naturally limited. Normally, without segmentation, the playback will continue unless the user stops it with some explicit signal from the person.

Humans have a limited "buffer" or working memory space of speech they have heard, but not yet transcribed, and if the remaining transcription is longer than this, then the segment will come to an end without them being able to complete the transcription of the segment. In our measurements, this is a normal common situation even for reasonably proficient typists, for typical segment lengths (as shown in Case A in FIG. 4).

In normal transcription systems, this issue is dealt with in three main ways. First, the user may halt the transcription manually (or with a foot pedal, if available) before their mental memory becomes overloaded. Second, the media might be played, then manually rewound and replayed reliant on user input. Third, some systems provide for variable speed playback, adjusted by the user to suit.

Where temporal and text segments are available, as is the case with ASR-based transcription, human editing is required to correct ASR errors, and playback is under manual control.

Transcription is also complicated because sometimes the media has long periods when there is no speech (or no intelligible speech), but the transcriber still needs to listen through the media (although may do so at faster speeds if the system supports it).

The invention addresses these problems. Firstly, the media is automatically segmented by the system, so that the amount of media that is played to the user is limited in any given segment, and is also normally logically coherent. Playback of the segment is under the system control, as is the automatic advance to the next segment when done. This automatic advance is performed through known keyboard combinations or spoken codes in the case of re-reading.

Figure 4:
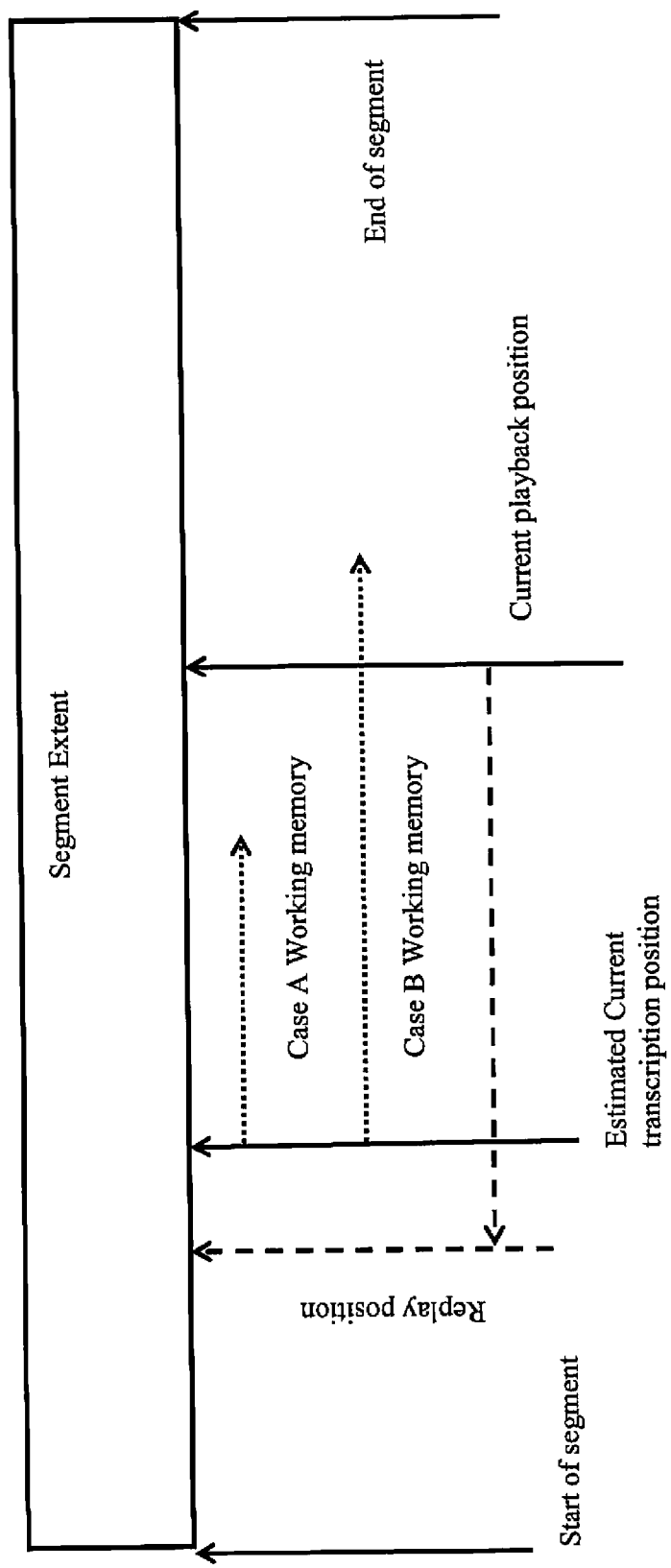
FIG. 4 is a timing diagram showing the replay system parameters.

The system for playing and replaying a segment is illustrated in FIG. 4. Because the system has adaptive knowledge of the amount of expected input, and the typing speed and working memory of the transcriber, it is able to replay an accurate portion of the untranscribed part of the segment to the user, rather than repeat the whole segment. This saves transcription time and is preferred by transcribers. In other words, the system "intelligently" replays the part that is estimated not yet to have been transcribed, so that the transcriber can complete the segment entry. As shown in FIG. 4, the system is able to automatically determine a suitable estimated condition to effect the replay, based on the estimated current transcription position, the current playback position, and the working memory of the transcriber. As shown, if the playback position runs beyond the working memory of the transcriber (Case A), then the system halts playback, resets the playback position to a suitable place before the estimated current transcription position (as described below), and then recommences playback. This process then repeats as necessary until the segment is transcribed. The control functions described may all be both set at typical a priori values, and also adapted to match the actual performance. The system allows some level of estimated overlap with what has already been transcribed, partly to account for estimation error, also to allow smooth lead-in for the transcriber. The system also continues this process of replaying according to input, and can be caused to stop the replaying on certain conditions (e.g. replay count, duration of segment, or inactivity on the part of the user—for example, it can be made to pause or stop if the user is not making input). Where the estimated start of the replay is (configurably, and typically within 2 seconds) close to the start of the segment, the system may instead replay the whole segment. Additionally, if the replay position is (configurably) too close to the end of the segment, a (configurable) minimum amount of playback time is used instead. In addition to automatic replay, the system may also cause replay to happen based on transcriber signalling (e.g. keystroke combinations), and this can set the replay position either to the start of the segment, or to a suitable position as described.

In the case of ASR derived Cues, replay can be estimated so that it restarts on a word boundaries rather than calculated times in the playback, the latter is more likely to result in fragmented words being played back, and sudden changes in audio volumes. In any case, whether VAD or ASR or other segmentation mechanisms are chosen, a fade-in approach to audio volume levels is preferred by users, and normally a 0.5 to 1 s fade-in is suitable for the system.

2.3 Variable Speed

In addition, if desired, the system can automatically alter the transcription playback based on the estimates of the rate that would match the typing capability of the user. For more proficient users, the system can automatically speed up the transcription playback. Intelligibility limits for playback rates are normally between 0.75 and 2.5 times normal speech rates (although higher speeds may be useful in audibly detecting speech regions by the transcriber). Manual control of playback speed may also be provided by the system using keyboard input or otherwise.

2.4 Starting and Ending Segment Playback

An indication from a transcriber or reviewer that a segment should be played, or that text input from the segment is complete, can be given by using programmable keyboard gestures (or any other suitable input gestures or commands or menu items or buttons) that do not interfere with transcribed text input. This applies both to transcription and review playback. These gestures can be chosen by the user configurably in the case of key commands. In addition, variants may signal to the system that the end of the segment is also the end of a line or end of a paragraph when the segments are combined into a full transcript. Once a segment is complete, the system can be set to automatically play the next valid segment (so that no explicit signal is needed from the transcriber or reviewer) and the process repeats.

2.5 Error Handling

Transcriber errors are handled by the system in a number of ways:

2.5.1 Spelling Etc.

Autocorrection of misspelled words, capitalisation and spell-checking are standard ways of improving these errors.

2.5.2 Smart Punctuation

In addition, a method of transferring punctuation between segments can be implemented as follows. Supposing there are two segments "the man mounted the horse" followed by "he then went to town". On entering the first segment, a transcriber is not able to punctuate that segment a priori, because the next segment could represent a continuation of the sentence (with no punctuation), or a phrase within a sentence (delimited by a comma for example), or the sentence could already be complete. When the transcriber hears the next segment "he then went to town", he or she might determine that the correct punctuation of the first segment is using a semi-colon. If the input to the second segment is "; he then went to town" the system will modify the segments by automatically transferring the starting semi-colon to the first segment so that it will read: "the man mounted the horse;" and the second segment becomes "he then went to town". Configurable rules determine the number of spaces that follow each type of punctuation. Note that the implementation needs to be sensitive to language-related rules, for example Spanish has the construct of the use of an exclamation mark at the start of the sentence, and these can be excluded from the automatic transfer mechanism described above. Alternative constructs for allowing such post-hoc punctuation could be achieved by other implementations such as input command codes.

Where a segment is not completed by punctuation, but is followed by a significant configurable gap in the estimated speech with a default gap of about 2 seconds or more where there is estimated not to be any speech, then the system may optionally automatically punctuate the segment with a period (full-stop) mark.

2.5.3 Review

A further mechanism for correcting transcription errors lies in the review facility of the system, which allows the transcriber or other reviewers to review the segment under system control (for example with auto-segment advance with or without user intervention), and the facility to make alterations to the transcript or metadata, including control of playback. In addition, the reviewer may mark the segment with an error/comment indicator and reviewer comments, for example using suitable keyboard combinations. The review system may then be caused to play back those segments that have not yet been reviewed, or have errors or comments marked.

2.6. Production of Full Transcription

The ability to merge segments into a full transcript with word-processor like layout is an important option for the system of the invention because it allows a simultaneous rendition of both caption-like transcripts and attractively formatted full transcripts. In addition, layout options are provided for various presentations to suit different applications. For example, full transcript output can be color-coded according to speaker; the speakers' names can be included; timecodes can be included; and notes can be included, optionally in different font styles, with brackets etc. The full transcript can be produced in a range of popular output formats.

2.7 Rich Metadata

The system goes beyond the presentation of simple captions, subtitles or text segments to allow a rich metadata set, appropriate to the application. Associated with the timing of any particular segment can be an arbitrary number of text, image and video links. The text may be ascribed to notes, descriptions or other textual information.

2.8 Rich Metadata Transmission and Display

The transmission of additional field types and their representation may, in the case of suitable format Timed Text Files, either be encoded in standardised representations, or be added by means of namespace extension in the case of XML format files such as TTML (DFXP) and SMIL. Suitable players can be provided to use these rich extensions and display them to suit.

2.9 Encoding, Languages, Scripts

The encoding of text may also be signalled, so that, for example, the text coding may be shown (e.g. UTF, so that a wide variety of scripts including non-Western ones may be stored); the meaning of the text representation may be stored as an attribute (e.g. plain text, HTML text, a URL to be opened—which allows for rich text display of any of the textual information). In addition, the language that the text is represented in is coded, and this allows any of the text fields to be provided with subtitles or translations from the original (which may be done by human translators or automatic systems or a combination of both).

2.10 Rich Text Transmission & Display

Additionally, in cases of bilateral standardisation of encoding of segment "textual" entries and the display thereof (or non-bilateral if supported by standardisation), the system can support full rich text and media in its encoding of that textual information. For example, HTML documents can be supported which allow for full mixing of styled text as well as images and other media, and this information can be encoded for transmission in suitable Timed Text files, and displayed in the publication with a suitable player; in cases of display on web browser technology, this support for HTML standards matches naturally to the browser display capabilities. In addition, depending on browser plugins supported by the viewer's browser, formats such as XAML (Extensible Application Markup Language) can be supported for transmission and display.

3. Integration with Media Production Systems

The components described above may be integrated with suitable Audio and Video production systems. These are normally referred to as Non-linear editing (NLE) systems for video systems, and multi-track audio production tools for Digital Audio Workstation systems. These lay out the desired source media "clips" on multiple tracks on a timeline which is then rendered into the published video or audio media (for example as shown in FIGS. 4 and 5). Popular systems include Adobe Premiere®, Apple® Final Cut Pro®, Microsoft Expression® Encoder, Avid® and Sony Vegas™ Pro.

The interaction between the production system and this system can be supported in a number of ways, depending on the capabilities of the media production tool; these include, for example, Edit Decision List (EDL) files or other databases, plugin support and Application Programming Interfaces, or by direct integration with the production tool.

3.1 Mapping Process

In suitable cases, the system of the invention may interact with this class of known system in a powerful way which provides substantial benefits. In particular, the multi-track timeline includes information about timing of the output video as well as the clip timings from the source material. When the interacting systems produce metadata information and segments applying to this material, logically, it applies to the source media, and can be mapped to the clip location on the timeline so that it appears at the right position in the output video. This has the great advantage that when clip positions are altered in the timeline (but not adjusted in relation to the source media), the relevant Timed Text output information can automatically be adjusted by the system of the invention (and passed to the multi-track editor if appropriate). This means that the media production and transcript production can be performed more simultaneously, and if it is desired to change the output media (for example as the result of the normal media production editing cycle), it will not affect the ability to automatically produce the relevant transcripts. In the case where additional (new) material is added to the timeline by this process, then that new material will of course need to be transcribed if that has not yet been done. In addition, if the source media has already been transcribed by the system, then it may be included in a new project (for a different video output), and the existing transcript will immediately be available in the new project without additional re-transcription work.

4. Applications

While the application of the methods and systems of the invention is described in terms of online Audio and Video material, and providing suitable timed metadata for those applications, it is also applicable to:

Broadcast systems and TV

Production of conventional transcripts, particularly those relating to evidential requirements Timed/annotated meeting transcripts generally Educational and pedagogical applications (e.g. lecture series, tutorials and other video/audio presentations with appropriately timed and searchable content).

Furthermore, for all of these applications, the availability of text-based transcripts and other metadata make it possible to search and locate the media of interest using generic Search Engines as well as specific search databases for the media assets.

In addition, the availability of this text metadata allows for the user to search within the media for items of interest, and have that item played to the user automatically (without having to manually search through the media).

Media may, in addition, be organised by means of channels or playlists. Association of text metadata with media in these collections allows for search to operate on the basis of a whole channel or playlist.

The presence of timed metadata also makes it possible to display associated information about the media at that point in time. In particular, this can include annotations and comments on what is being said, notes which can reference other information and display this simultaneously, images of interest, a highlighted view of the full transcript, and also the ability to display other web content dynamically based on the current timing and metadata. This latter ability is relevant in the context of online advertising and "clickthrough" applications.

All the textual information can have translated alternative language or script renditions. These may be produced by automated translation systems or by manual input.

The invention may be used in conjunction with suitable media production tools, which allows flexible reuse of existing transcripts, efficient transcript production workflow in conjunction with media production, and the ability to alter the media timeline and retain accurate transcript timing.

The invention claimed is:

1. A speech media transcription system comprising a playback device arranged to play back speech delimited in segments, the system being programmed: to play back an entire segment for a transcriber to transcribe; to estimate a limit of a working memory of the transcriber; to provide, for a segment being transcribed, an adaptive estimate of the proportion of the segment that has not been transcribed by the transcriber; and subsequently to play back again said proportion of the segment that has not been transcribed, immediately when the adaptive estimate indicates that a current playback position is exceeding the limit of the working memory of the transcriber.

2. A transcription system according to claim 1, wherein the adaptive estimate is made on the basis of at least one of: an amount of text likely to be present in the segment, a speaking speed of the speaker, a text input rate of the transcriber, or a working memory of the transcriber.

3. A system according to claim 1, wherein where analysis of a segment indicates that it contains no speech, the segment is omitted from playback or played at high speed.

4. A system according to claim 1, arranged to monitor a text input rate of the transcriber and to play back said speech at a speed depending on said text input rate.

5. A system according to claim 1, comprising a facility for automatically transferring a typed punctuation mark to a previously typed segment.

6. A system according to claim 1, comprising a facility for automatically replaying said speech for review and correction of a transcription.

7. A system according to claim 1, comprising a facility for allowing identification by a reviewer of segments of text considered erroneous.

8. A method of transcribing speech media, comprising providing a system according to claim 1, allowing a transcriber to transcribe part of a segment of the speech media, replaying said proportion of the segment estimated not to have been transcribed, and subsequently determining that said segment has been completely transcribed.

* * * * *